(12) United States Patent
Sun et al.

(10) Patent No.: US 12,379,649 B2
(45) Date of Patent: *Aug. 5, 2025

(54) DEVICE AND METHOD FOR DYNAMIC TIME-LAPSE PHOTOGRAPHY

(71) Applicant: Nantong Schmidt Opto-Electrical Technology Co. Ltd., Nantong (CN)

(72) Inventors: Yufeng Sun, Nantong (CN); Daming Li, Nantong (CN); Xuefeng Zhu, Nantong (CN)

(73) Assignee: Nantong Schmidt Opto-Electrical Technology Co. Ltd., Ragao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,737

(22) Filed: Jun. 20, 2024

(65) Prior Publication Data
US 2024/0337913 A1     Oct. 10, 2024

Related U.S. Application Data

(63) Continuation of application No. 17/746,752, filed on May 17, 2022, now Pat. No. 12,044,954, which is a (Continued)

(30) Foreign Application Priority Data

Oct. 14, 2020   (CN) .......................... 202011094279.6

(51) Int. Cl.
*G03B 17/56*     (2021.01)
(52) U.S. Cl.
CPC .................................. *G03B 17/561* (2013.01)

(58) Field of Classification Search
None
See application file for complete search history.

(56) References Cited

U.S. PATENT DOCUMENTS 2,719,471 A  * 10/1955 Aspden ................ B66F 11/048
                                                  396/428
3,103,257 A  *  9/1963 Richards ............. B66F 11/048
                                                  396/428

(Continued)

FOREIGN PATENT DOCUMENTS

CN        204180166 U      2/2015
CN        205690018 U     11/2016
(Continued)

*Primary Examiner* — Rodney E Fuller
(74) *Attorney, Agent, or Firm* — Chernoff, Vilhauer, McClung & Stenzel LLP

(57) ABSTRACT

A mount comprises: a bracket assembly for holding an image-capture device; a drive shaft rotatably coupled to a stationary wheel for rotation of the drive shaft relative to the stationary wheel about a drive shaft axis; a support member coupled to the drive shaft to rotate about the drive shaft axis therewith, the support member extending radially away from the drive shaft axis; a rotational wheel rotatably coupled to the support member for rotation of the rotational wheel relative to the support member about a rotational wheel axis radially spaced apart from, and parallel to, the drive shaft axis, and coupleable to the bracket assembly such that rotation of the rotational wheel about the rotational wheel axis causes corresponding rotation of the bracket assembly about the rotational wheel axis; and a belt entrained around the stationary wheel and the rotational wheel.

20 Claims, 11 Drawing Sheets

Related U.S. Application Data continuation-in-part of application No. PCT/CN2020/134169, filed on Dec. 7, 2020.

(56) References Cited

U.S. PATENT DOCUMENTS

| | | | |
|---|---|---|---|
| 4,952,953 A | 8/1990 | Ridderstople et al. | |
| 12,044,954 B2 * | 7/2024 | Sun | F16G 1/00 |
| 2003/0076480 A1 * | 4/2003 | Burbulla | B66F 11/048 396/419 |
| 2013/0259463 A1 | 10/2013 | Dybowski | |
| 2015/0366336 A1 | 12/2015 | Wong | |

FOREIGN PATENT DOCUMENTS

| | | |
|---|---|---|
| CN | 107883124 A | 4/2018 |
| CN | 108488566 A | 9/2018 |
| CN | 108700250 A | 10/2018 |
| CN | 210687572 U | 6/2020 |

\* cited by examiner

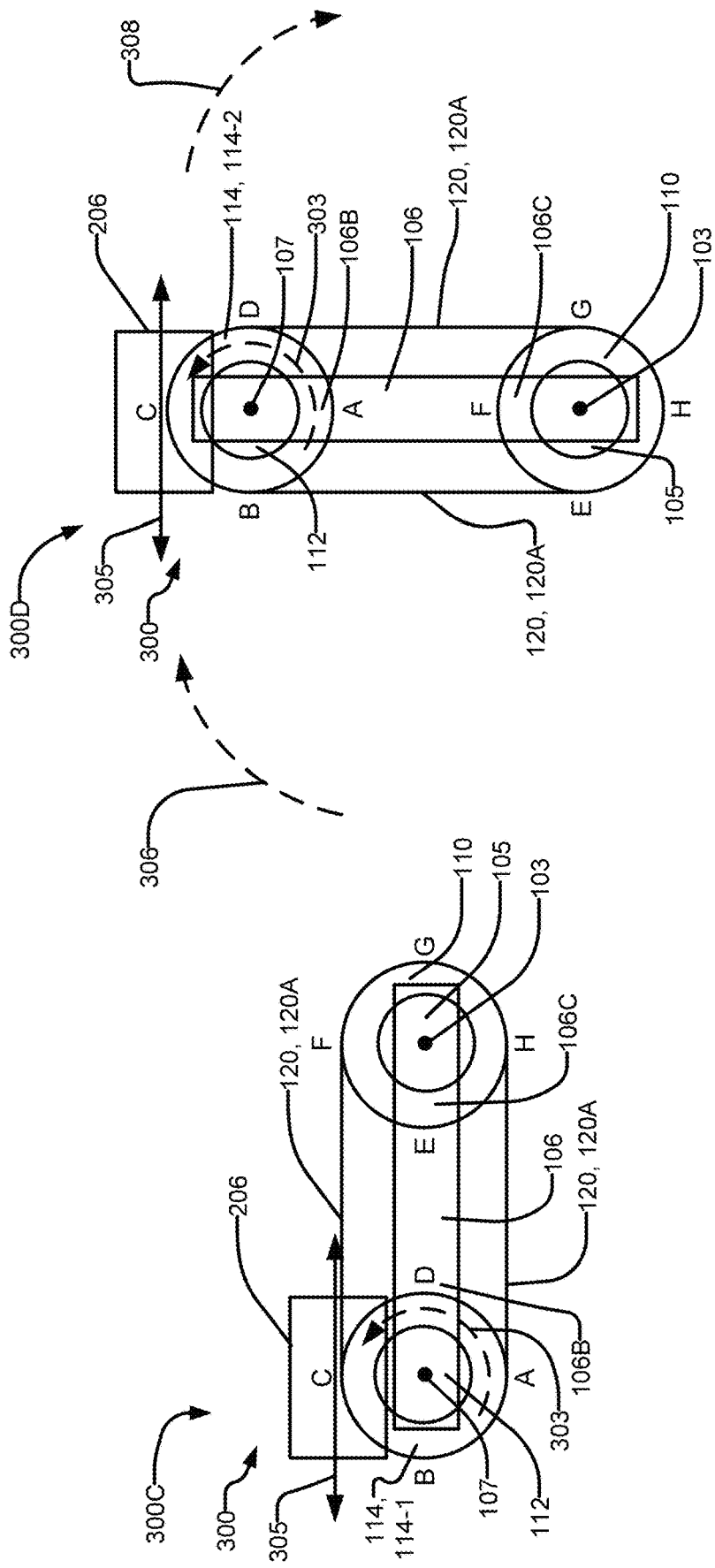

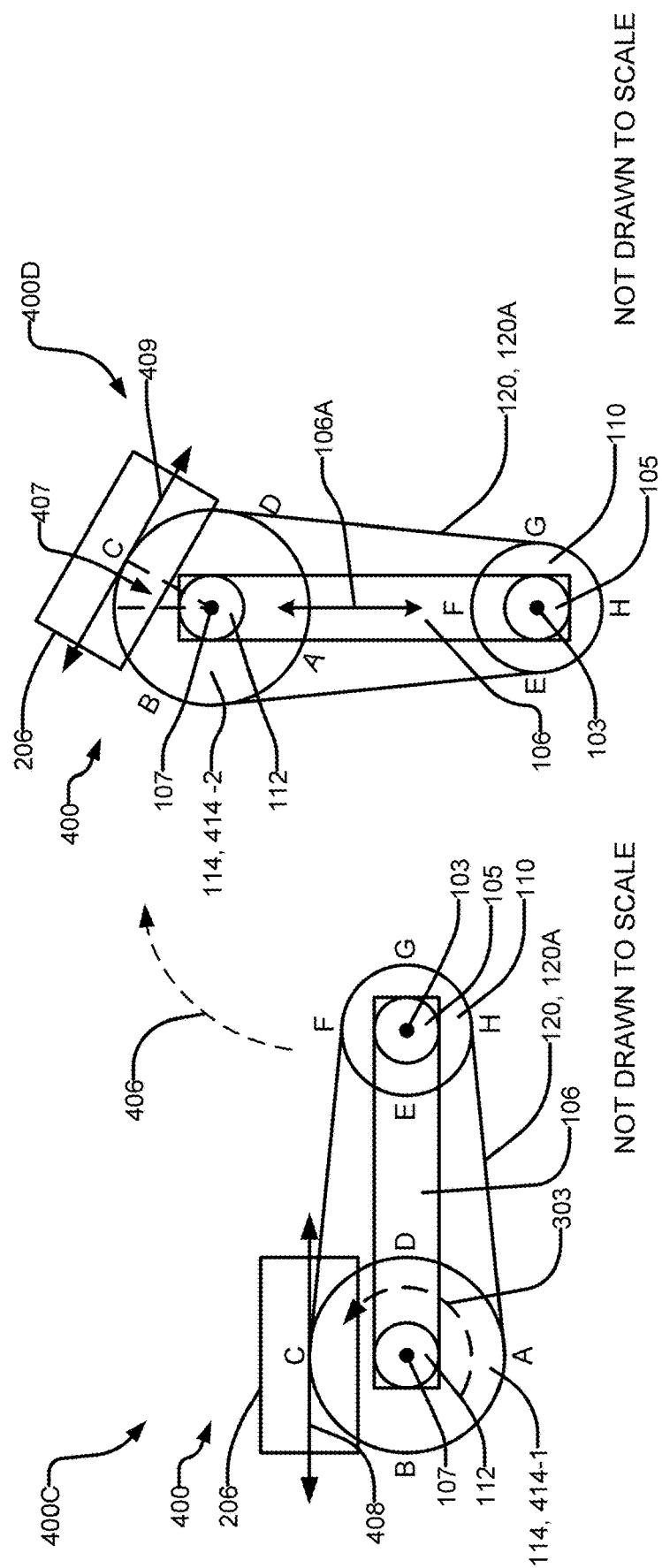

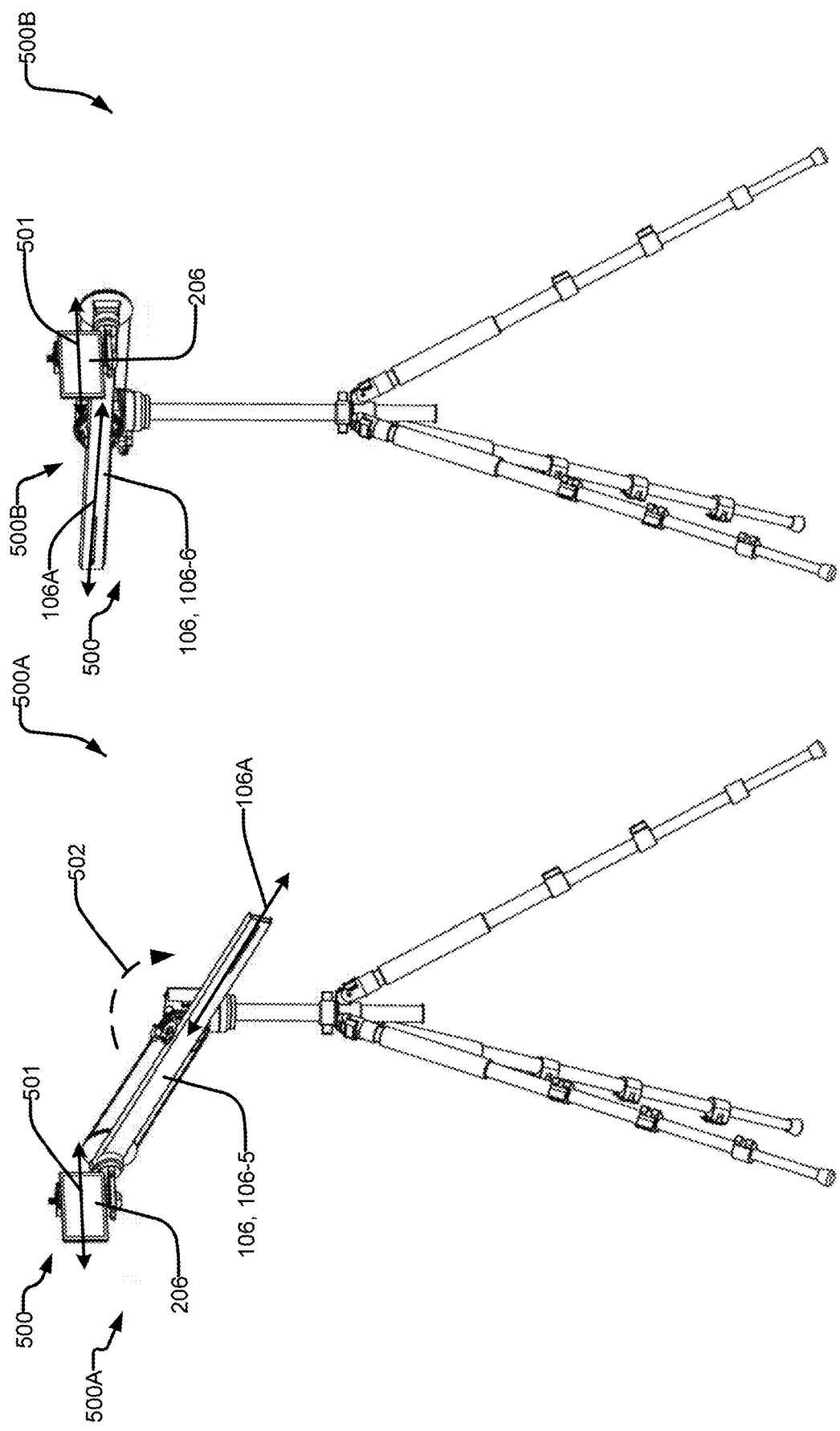

DEVICE AND METHOD FOR DYNAMIC TIME-LAPSE PHOTOGRAPHY

REFERENCE TO RELATED APPLICATIONS

This application is a continuation of U.S. application Ser. No. 17/746,752 filed 17 May 2022, which is in turn a continuation-in-part of Patent Cooperation Treaty Application No. PCT/CN2020/134169 having an international filing date of 7 Dec. 2020, which in turn claims priority from Chinese Application No. 202011094279.6 filed 14 Oct. 2020. All of the applications referred to in this paragraph are hereby incorporated herein by reference for all purposes.

TECHNICAL FIELD

The present invention relates to the field of photography (image capture) and photographic devices. Some aspects of the invention relate to device and method for dynamic time-lapse photography.

BACKGROUND

Photography relates to capturing images by recording light electronically (e.g. using suitable image sensors) or chemically (e.g. using light-sensitive film). Image capture devices (e.g. cameras) typically include optical components (one or more lenses, mirrors and/or the like) for directing light from a scene onto a light-sensitive surface (e.g. a sensor surface or film surface) typically located within a body of the image capture device.

Time-lapse photography is a popular technique in photography and videography, where images are captured (typically periodically) over time and the frequency at which images are captured is significantly lower than the frequency at which the captured images are subsequently viewed. For example, images of a scene may be captured at a frequency of 1 frame per second and then played back at a rate of 30 frames per second. The effect of time lapse photography is that processes that would normally appear subtle and slow to the human eye (e.g. the sprouting of a flower or the construction of a building) appear to occur faster on playback.

Typically, time-lapse image capture devices are held static, by a suitable device support (mount) or otherwise, while images are captured, so that the field of view of the image-capture device remains relatively constant. In some cases, interesting effects can be obtained by moving the image-capture device while images are captured. The current state-of-the-art time-lapse setups utilize device supports (mounts) that facilitate only translational movement of the image-capture device (e.g. from left to right or right to left). Consequently, the resulting captured images and/or time-lapse videos only exhibit the effects of translational movement of the image-capture device. Moreover, translational movement of the image-capture device is often only noticeable in the playback of a time-lapse video for objects positioned relatively close to the image-capture device, and not for objects positioned relatively far away from the image-capture device.

To achieve various visual effects in time-lapse photography (image capture) and corresponding time-lapse playback, there is a desire for a device support (e.g. mount) that supports dynamic movement of an image-capture device supported thereon, where such dynamic movement is not restricted to simple translational or panning movements.

Mounts which provide other types of movements for image-capture devices supported thereon, such as two-dimensional movement rotation and/or rotation in combination with translation or panning and/or the like may be desired.

Therefore, there is a general desire for new devices and methods for facilitating dynamic time-lapse photography.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a mount for an image-capture device. The mount comprises a bracket assembly for holding an image-capture device; a drive shaft rotatably coupled to a stationary wheel for rotation of the drive shaft relative to the stationary wheel about a drive shaft axis; a support member coupled to the drive shaft to rotate about the drive shaft axis therewith, the support member extending radially away from the drive shaft axis; a rotational wheel rotatably coupled to the support member for rotation of the rotational wheel relative to the support member about a rotational wheel axis, the rotational wheel axis radially spaced apart from, and parallel to, the drive shaft axis; the rotational wheel fixedly coupled to the bracket assembly such that rotation of the rotational wheel about the rotational wheel axis causes corresponding rotation of the bracket assembly about the rotational wheel axis; a belt entrained around the stationary wheel and the rotational wheel.

The rotation of the drive shaft relative to the stationary wheel about the drive shaft axis causes corresponding rotation of the support member relative to the stationary wheel about the drive shaft axis and wherein rotation of the support member about the drive shaft axis in combination with entrainment of the belt around the stationary wheel and the rotational wheel cause corresponding rotation of the rotational wheel and the bracket assembly relative to the support member about the rotational wheel axis.

In some embodiments, the bracket assembly comprises a clamp.

In some embodiments, the mount further comprises a channel-providing member shaped to define a channel. The channel-providing member may be fixedly coupled to, or integrally formed with, the drive shaft. The channel-providing member may comprise a pair of walls elongated in a direction of radial extension of the support member and spaced apart in a direction orthogonal to the radial extension of the support member wherein the pair of walls defines the channel.

The mount may comprise a releasable locking mechanism configurable in: an unlocked configuration which permits slidable adjustment of the support member in the direction of radial extension within the channel; and a locked configuration which fixes the support member in the direction of radial extension within the channel.

In some embodiments, the releasable locking mechanism comprises a set screw.

In some embodiments, the stationary wheel is shaped to define a bore that extends through a center of the stationary wheel and where the drive shaft extends through the bore.

In some embodiments, the bracket assembly comprises a shaft coupled to the rotational wheel for rotation therewith about the rotational wheel axis.

In some embodiments, the support member is shaped to define a bore at a location of the support member spaced in a direction of radial extension away from the drive shaft axis and the shaft extends through the bore.

The shaft may bear rotationally against a bore-defining surface of the support member.

In some embodiments, the bracket assembly comprises an arm adjustably coupled to the shaft.

In some embodiments, the bracket assembly further comprises a U-shaped seat defining a groove at a base of the U-shaped seat and a proximal end of the arm of the bracket assembly comprises a protrusion shaped to be complementary to, and fit into, the groove of the U-shaped seat.

In some embodiments, the bracket assembly comprises a lockable pivot joint mechanism which permits pivotal movement of the arm relative to the U-shaped seat about a pivot axis that is orthogonal to the rotational wheel axis.

In some embodiments, a radius of stationary wheel is the same as a radius of the rotational wheel.

In other embodiments, a radius of stationary wheel is different from a radius of the rotational wheel.

The belt may be a toothed belt that may engage with corresponding teeth on outer circumferences of the stationary wheel and the rotational wheel.

A number of teeth on the outer circumference of the stationary wheel may be the same as a number of teeth on the outer circumference of the rotational wheel.

A number of teeth on the outer circumference of the stationary wheel may be different than a number of teeth on the outer circumference of the rotational wheel.

The mount may comprise a stand comprising a gimbal. The stationary wheel may be rigidly connected to the gimbal.

The stand may comprise a pivot joint for facilitating pivotal movement of the gimbal relative to the remainder of the stand about a stand axis.

Another aspect of the invention provides a method for photography. The method comprises: mounting an image capture device in the bracket assembly of the mount described above or elsewhere herein; rotationally driving the drive shaft relative to the stationary wheel about the drive shaft axis to thereby cause corresponding rotation of the support member relative to the stationary wheel about the drive shaft axis and wherein rotation of the support member about the drive shaft axis in combination with entrainment of the belt around the stationary wheel and the rotational wheel cause corresponding rotation of the rotational wheel and the bracket assembly relative to the support member about the rotational wheel axis; and capturing images using the image capture device at different positions of the bracket assembly about the rotational wheel axis.

In addition to the exemplary aspects and embodiments described above, further aspects and embodiments will become apparent by reference to the drawings and by study of the following detailed descriptions.

BRIEF DESCRIPTION OF THE DRAWINGS

Further features and advantages of the present invention will become apparent from the following detailed description, taken in combination with the appended drawings, in which:

FIGS. 3C-3F schematically illustrate the relative rotational movement between the rotational wheel and the stationary wheel in the example image-capture mount of FIGS. 3A and 3B.

FIGS. 4C and 4D schematically illustrate the relative rotational movement of the rotational wheel and the stationary wheel in the example image-capture mount of FIGS. 4A and 4B.

FIG. 5A depicts another example image-capture mount in another configuration in a first orientation and its arm in a corresponding first angular position.

FIG. 5B depicts the example image-capture mount of FIG. 5A in a second orientation and its arm in a corresponding second angular position.

It will be noted that throughout the appended drawings, like features are identified by like reference numerals.

DETAILED DESCRIPTION

The present image-capture mount devices and corresponding methods allow for dynamic movements during photography. The dynamic movements may include 2-dimensional movements of image-capture devices. Such 2-dimensional movements may comprise combinations of rotation and/or translation of the image-capture device. The image-capture mount devices also allow for rotational movements to be linked. For example, the rotation of one element may simultaneously bring about the rotation of another element through a transfer of rotational power. The dynamic movements allowed for by the image-capture mount devices and methods may be applied to time-lapse photography or any other image-capture applications.

Figures 6A, 6B:
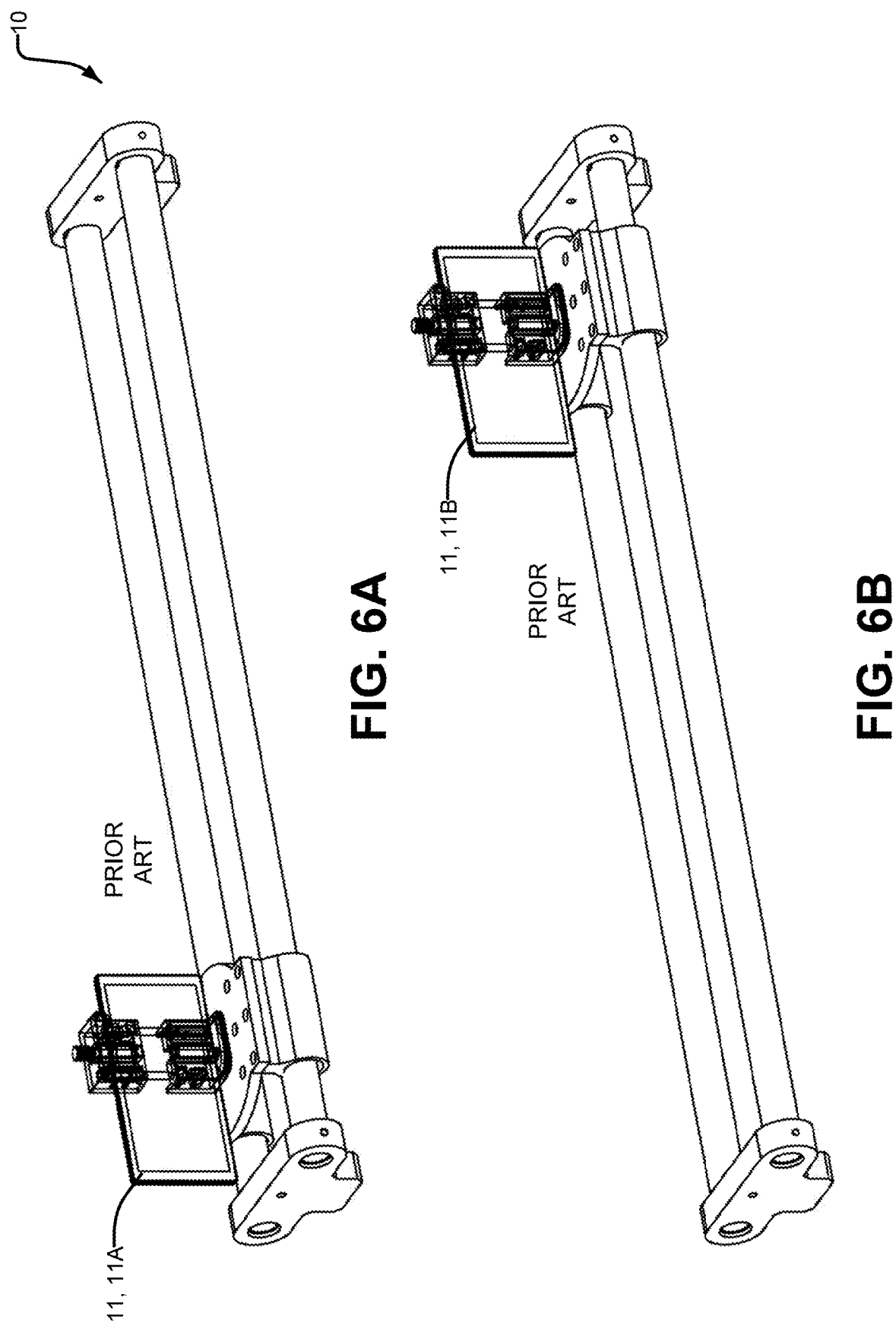
FIG. 6A illustrates a prior art mount for time-lapse photography in a first configuration.
FIG. 6B illustrates the FIG. 6A prior art mount in a second configuration.

FIGS. 6A and 6B depict perspective views of first and second configurations of a prior art time-lapse photography mount 10, which permits only one-dimensional translational movement of image-capture device 11 between end positions 11A and 11B shown in FIGS. 6A and 6B.

Figure 1:
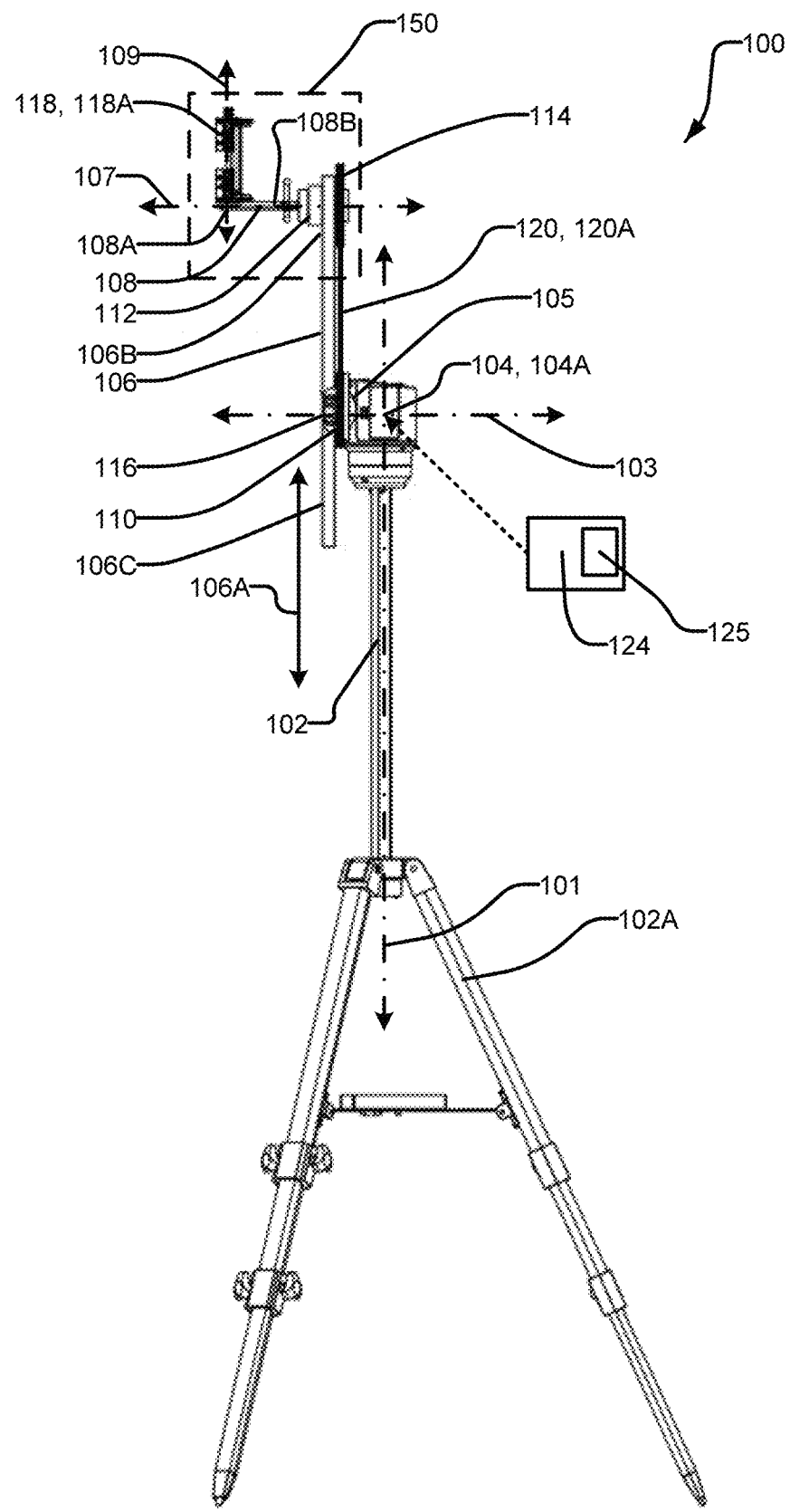
FIG. 1 illustrates an image-capture mount device, in accordance with an example embodiment.

FIG. 1 illustrates a mount 100 for image-capture according to a particular example embodiment of the invention. Mount 100 may be used in conjunction with an image-capture device (not shown in FIG. 1). Specifically, mount 100 may support or otherwise hold an image-capture device to apply methods of time-lapse photography, a number of examples of which are disclosed herein.

Mount 100 of the FIG. 1 embodiment comprises a stand 102. Stand 102 comprises or is coupled to a base 102A. In the illustrated FIG. 1 embodiment, base 102A comprises a tripod. In general, however, stand 102 (including base 102A) may be any suitable device known in the art for holding stand 102 in position (e.g. on the ground or on some other suitable structure) or for attaching stand 102 to a suitable structure. Stand 102 supports a gimbal 104 coupled to stand 102. In some embodiments, gimbal 104 is rotatable about stand axis 101 relative to stand 102.

Gimbal 104 comprises a drive shaft 105 rotatable (e.g. relative to stand 102) about drive shaft axis 103 and a motor 104A configured to drive the rotation of drive shaft 105. A suitably configured controller 124 may be configured (e.g. with suitable electronic hardware and/or software) to control motor 104A. Controller 124 may be any suitable device and its connection to motor 104A may be wired or wireless. For example, controller 124 may comprise a smartphone. Controller 124 of the illustrated embodiment comprises a processor 125. Controller 124 (including processor 125) and any associated drive electronics (not shown) may be configured to process and control a variety of parameters when motor 104A drives drive shaft 105 to rotate about drive shaft axis 103. For example, the parameters may include rotational speed, angle of rotation, number of rotational periods, timing intervals, etc. The particulars of controller 124, processor 125, the drive electronics and control parameters may depend on the specific type of image-capture application for which mount 100 is to be used. Different controller 124s with different processors 125, different drive electronics and different control parameters may be provided for different image-capture applications.

Figure 1A:
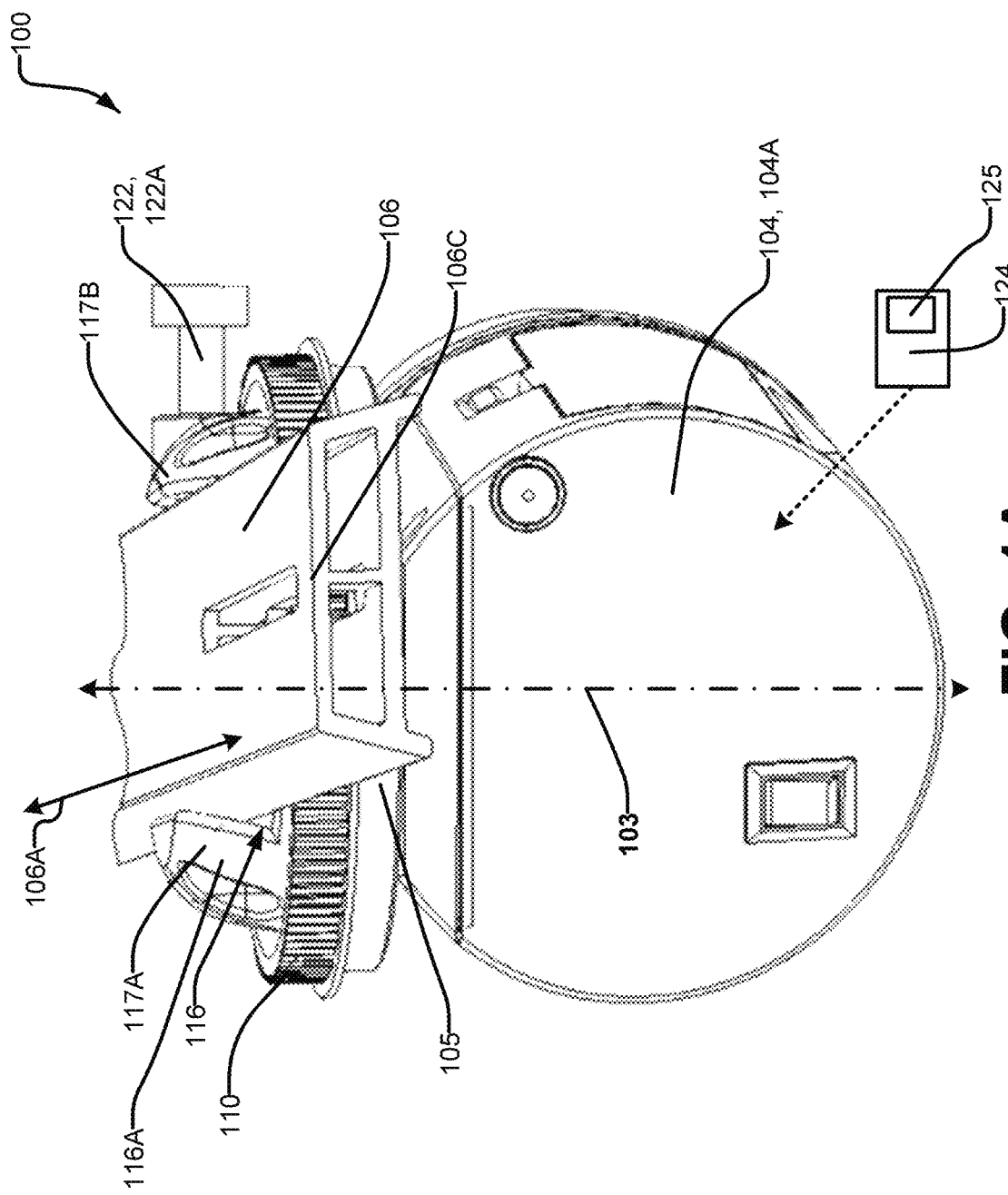
FIG. 1A illustrates a detailed partial perspective view of the FIG. 1 mount illustrating the connection of the gimbal to the support member in accordance with an example embodiment.

As shown best in FIG. 1A, stationary wheel 110 is fixedly coupled to gimbal 104. Stationary wheel 110 is shaped to define a bore (not visible in the illustrated views), allowing drive shaft 105 to extend through stationary wheel 110 in the direction of drive shaft axis 103. A sliding channel 116 is rotatably coupled to gimbal 104 by being defined on a surface of drive shaft 105 or, as in the case of the embodiment illustrated in FIG. 1A, by being defined in a channel-providing member 116A fixedly coupled to drive shaft 105. A support member 106 is slidably coupled within sliding channel 116, such that support member 106 is also rotatable about drive shaft axis 103 relative to gimbal 104 through drive shaft 105.

Support member 106 is elongated in an elongation direction (shown in FIGS. 1 and 1A by double-headed arrow 106A). The slidable coupling between support member 106 and sliding channel 116 allows adjustment of the position of support member 106 in elongation direction 106A. Device 100 further comprises a releasable locking mechanism 122 (shown in FIG. 1A), which is configurable between: a locked configuration, which locks the coupling between support member 106 and sliding channel 116 (or channel-providing member 116A) and thereby fixes the position of support member 106 (in extension direction 106A) within sliding channel 116; and an unlocked configuration, which unlocks the coupling between support member 106 and sliding channel 116 and thereby allows the position of support member 106 to be adjusted (in extension direction 106A) within sliding channel 116. In the illustrated embodiment of FIG. 1A, locking mechanism comprises a set screw 122A, although locking mechanism 122 may be provided by any suitable additional or alternative locking mechanism.

FIG. 1A illustrates a detailed partial perspective view of the FIG. 1 mount 100 illustrating the connection of gimbal 104 (and, more particularly, drive shaft 105) to support member 106 according to an example embodiment. Sliding channel 116 is defined on a surface of drive shaft 105 or, as is the case in the illustrated embodiment of FIG. 1A, defined in a channel providing element 116A rigidly coupled to drive shaft 105 and rotatable (with drive shaft 105) relative to gimbal 104 and relative to stand 102 about drive shaft axis 103. Sliding channel 116 of the FIG. 1A example embodiment is defined, at least in part, by a pair of walls 117A, 117B of channel-providing member 116A which are elongated in extension direction 106A and which are spaced apart from one another in a direction orthogonal to extension direction 106A to define channel 116 through which support member 106 may be adjustably positioned in extension direction 106A, as discussed herein. As discussed above, locking mechanism 122 of the illustrated FIG. 1A embodiment comprises set screw 122A.

Figure 2:
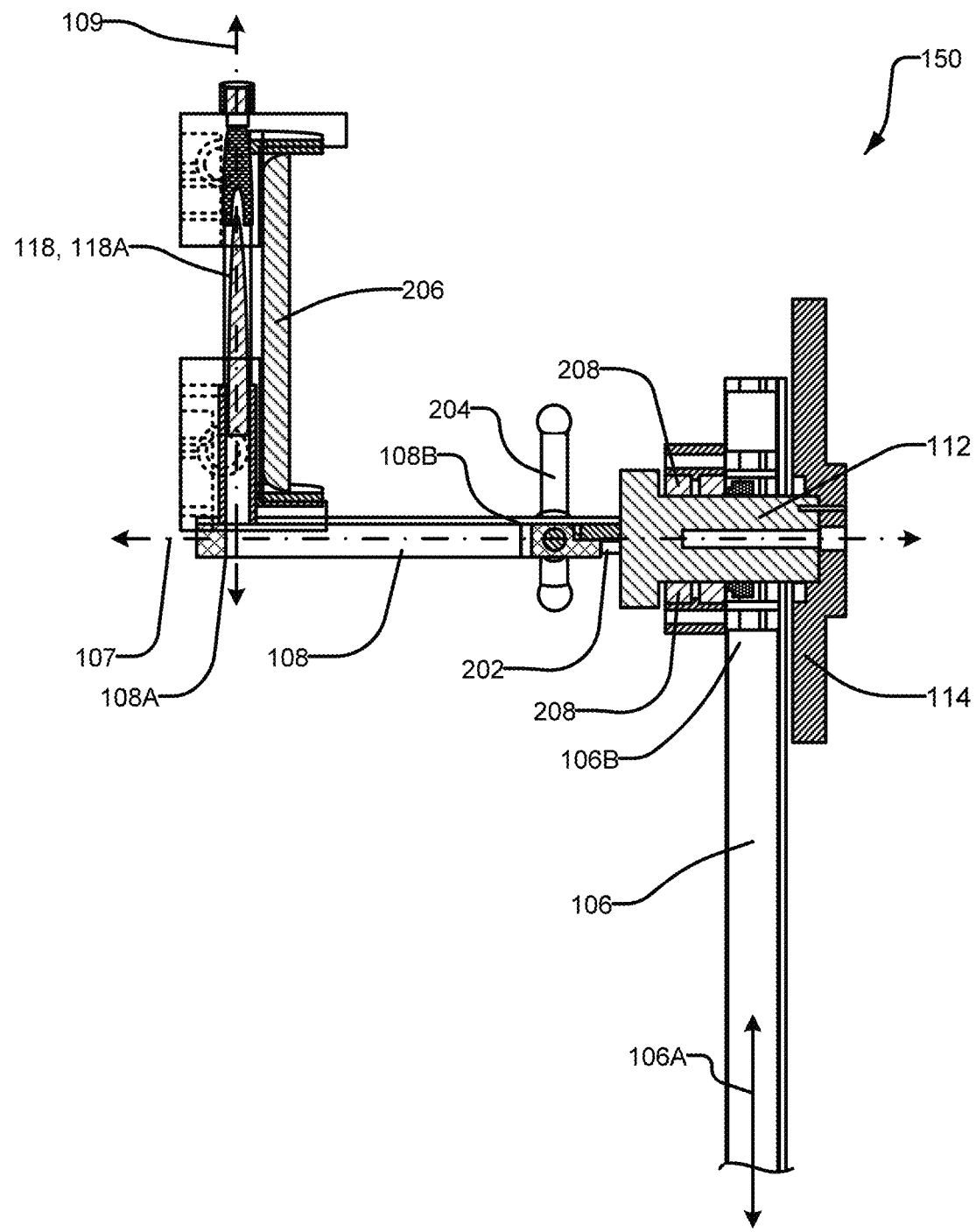
FIG. 2 schematically illustrates a cross-sectional view of a bracket assembly for use with the FIG. 1 mount in accordance with an example embodiment.

Returning to FIG. 1 with additional reference to FIG. 2, mount 100 further comprises a bracket assembly 150 coupled to support member 106 at a distal end 106B (i.e. distal from drive shaft axis 103). Bracket assembly 150 of the illustrated embodiment comprises an arm 108, a shaft 112, a rotational wheel 114 and a bracket head 118. Shaft 112 is rigidly coupled to rotational wheel 114 and both shaft 112 and rotational wheel 114 are rotatable together about rotational wheel axis 107 relative to support member 106. Bracket assembly 150 may also comprise bearings (which may form part of a bore-defining surface) 208 around shaft 112 to provide support to shaft 112 and to facilitate rotation of shaft 112 about rotational wheel axis 114. Arm 108 extends in the direction of (and/or parallel to) rotational wheel axis 107 and is adjustably coupled to shaft 112.

Bracket head 118 is coupled to arm 108 at a distal edge 108A of arm 108 (i.e. the end 108A of arm 108 that is distal from support member 106). Bracket head 118 may be rotatably coupled to arm 108 for pivotal motion about bracket head axis 109. Bracket head 118 may be adjusted to any angular orientation about bracket head axis 109 and locked in such a position. Such pivotal adjustment (of bracket head 118 about bracket head axis 109) may allow bracket head 118 to pivot in a manner which adjusts the field of view of the image-capture device, so that portions of mount 100 are outside of the field of view of the image-capture device.

Bracket head 118 may comprise a clamp mechanism 118A of any suitable type for removably holding an image-capture device in bracket head 118 of bracket assembly 150. Bracket head 118 may optionally comprise a wired and/or wireless electronic connector for electronically connecting to and controlling an image-capture device held in bracket head 118. The particulars of the clamp mechanism and electronic connector of bracket head 118 may depend on the specific type of image-capture device with which mount 100 is to be used and different clamp mechanisms and different electronic connectors may be provided for different image-capture devices.

Referring back to FIG. 1, belt 120 is entrained around rotational wheel 114 and around stationary wheel 110 in a taut loop to provide a pulley mechanism 120A. Pulley mechanism 120A may have a uniform tension force throughout belt 120. Friction is present on the surface of contact between belt 120 and rotational wheel 114 and between belt 120 and stationary wheel 110. Through its coupling with drive shaft 105 via support member 106, pulley mechanism 120A is capable of transferring torque from drive shaft 105 to rotational wheel 114 causing rotational wheel 114 to rotate about rotational wheel axis 107 when drive shaft 105 and, consequently, support member 106 rotate about drive shaft axis 103.

When motor 104A drives drive shaft 105 (and support member 106) to rotate about drive shaft axis 103, a torque is generated as if a force is being applied to a distal end 106B of support member 106 in a direction perpendicular to rotational wheel axis 107. This force is transferred by pulley mechanism 120A (e.g. by friction between belt 120 and rotational wheel 114) to rotational wheel 114, thus generating a corresponding torque on rotational wheel 114 about rotational wheel axis 107. This torque causes rotational wheel 114 to rotate about rotational wheel axis 107 in a rotational direction opposite to the rotational direction of support member 106 about drive shaft axis 103. For example, if support member 106 rotates about drive shaft axis 103 in a clockwise direction, then rotational wheel 114 would be caused to rotate about rotational wheel axis 107 in a counter-clockwise direction.

In some embodiments, rotational wheel 114 and stationary wheel 110 have the same radius. In other embodiments, rotational wheel 114 and stationary wheel 110 have different radii. In some embodiments, belt 120 and/or wheels 110, 114 comprise a slip mitigation system (e.g. hook and loop fasteners) for reducing slip in pulley mechanism 120A (e.g. between belt 120 and either of wheels 110, 114). In some embodiments, belt 120 comprises teeth that engage with corresponding teeth on stationary wheel 110 and/or rotational wheel 114.

FIG. 2 illustrates a cross sectional view of a bracket assembly 150 according to a particular example embodiment suitable for use with mount 100.

Figure 2A:
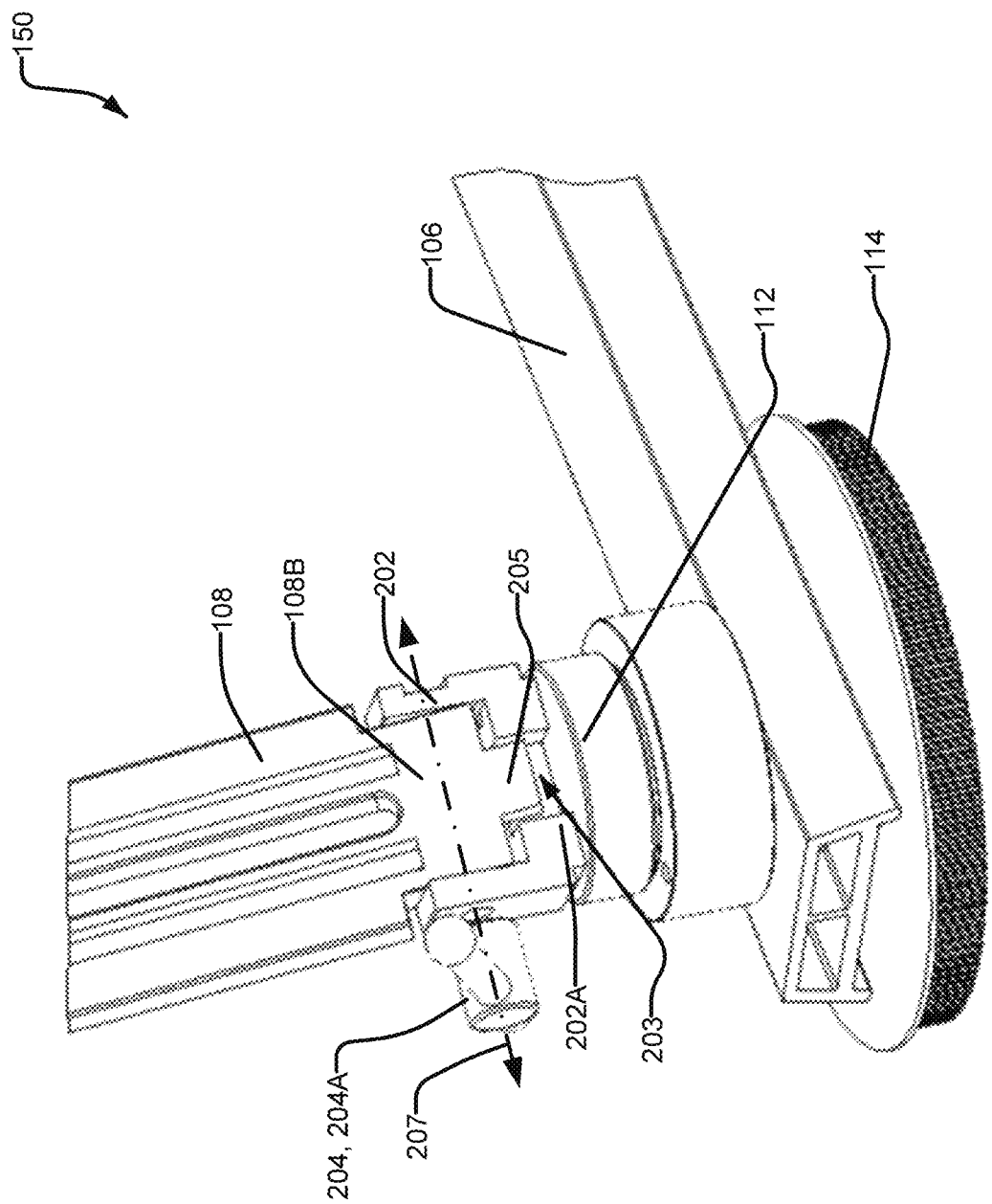
FIG. 2A illustrates a perspective view of a U-shaped seat of the FIG. 2 bracket assembly in accordance with an example embodiment.

Bracket assembly 150 may comprise a U-shaped seat 202 coupled to shaft 112 and adjustably fixed to arm 108. FIG. 2A illustrates a perspective view of a bracket assembly 150 illustrating the particular example embodiment of coupling between arm 108 and U-shaped seat 202 according to one example embodiment. Referring to FIG. 2A, U-shaped seat 202 is shaped to define a groove 203 at a base 202A of the U-shaped seat 202. Arm 108 comprises a protrusion 205 at proximal end 108B of arm 108 (i.e. at the end 108B of arm 108 closest to support member 106) and protrusion 205 is shaped to be complementary to the shape of groove 203 of U-shaped seat 202.

Bracket assembly 150 may further comprise a pivot joint mechanism 204A configured to provide an adjustable connection between arm 108 and U-shaped seat 202. In the illustrated embodiment, pivot joint mechanism 204A may comprise arm 108, U-shaped seat 202, a pivot shaft (not expressly visible in FIG. 2A) and user-adjustable knob 204 and may facilitate relative pivotal adjustment of arm 108 and seat 202 (and support member 106) about a pivot axis 207 (shown in FIG. 2A).

Pivot joint mechanism 204A allows adjusting the orientation of arm 108 relative to support member 106 and relative to rotational wheel axis 107 by pivoting arm 108 about pivot axis 207. Pivot joint mechanism 204A is configurable between: a locked configuration, where knob 204 locks the coupling between arm 108 and U-shaped seat 202 and thereby fixes the orientation of arm 108 relative to support member 106 rotational wheel axis 107; and an unlocked configuration, which unlocks the coupling between arm 108 and U-shaped seat 202 and thereby allows the orientation of arm 108 to be adjusted about pivot axis 207 relative to support member 106 rotational wheel axis 107.

Returning to FIG. 2, an image-capture device 206 is held through the clamping mechanism 118A of bracket head 118. Clamping mechanism 118A may be loosened to allow image-capture device 206 to be placed within the clamp and then tightened to a suitable degree to secure image-capture device 206. In some embodiments, clamping mechanism 118A allows image-capture device 206 to be oriented at any angle around bracket head axis 109 by virtue of bracket head 118 being rotatably coupled to arm 108 at distal end 108A of arm 108.

Image-capture device 206 may be adjusted in up to three degrees of freedom. For example, image-capture device 206 may be rotated about rotational wheel axis 107 through its coupling with bracket head 118 which is in turn coupled to shaft 112 via arm 108 as described herein. When shaft 112 rotates with rotational wheel 114 about rotational wheel axis 107, image-capture device 206 also rotates about rotational wheel axis 107. Image-capture device 206 may also be adjusted about pivot axis 207 (relative to support member 106 and rotational wheel axis 107) through pivot joint mechanism 204A as described herein. Image-capture device 206 may also be oriented at any angle around bracket head axis 109 through its coupling to a rotatable bracket head 118 as described herein.

Figures 3A, 3B:
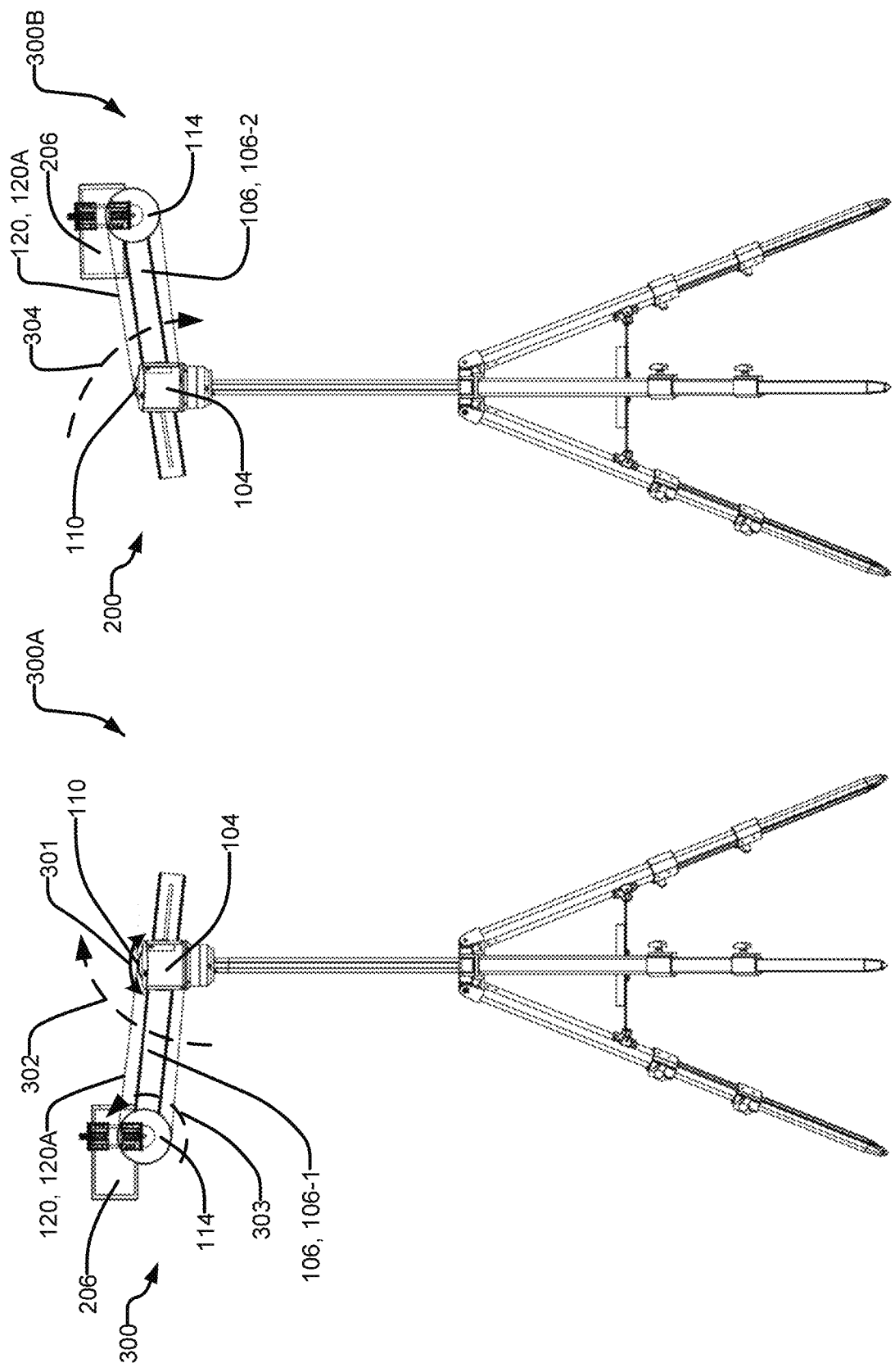
FIG. 3A depicts one example image-capture mount in a first orientation and its arm in a corresponding first angular position.
FIG. 3B depicts the example image-capture mount of FIG. 3A in a second orientation and its arm in a corresponding second angular position.
Figure 3E:
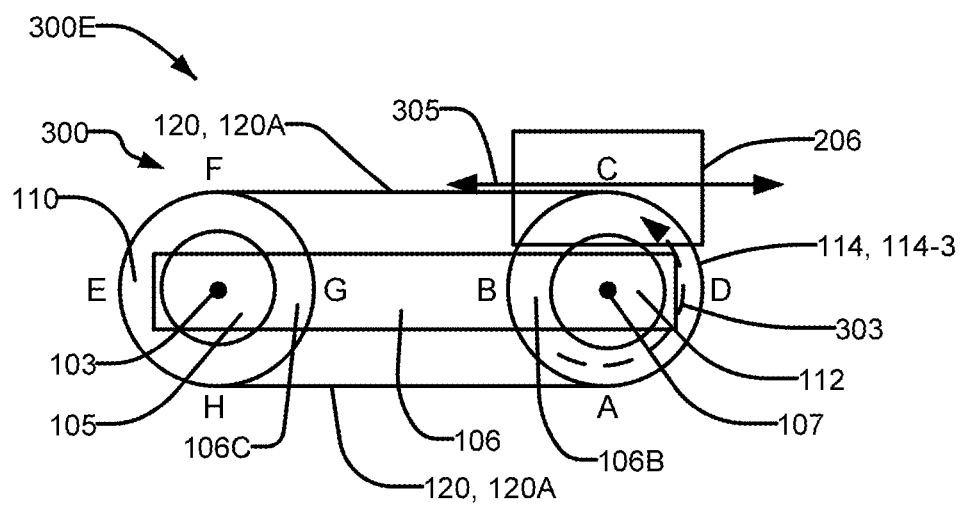
Figure 3F:
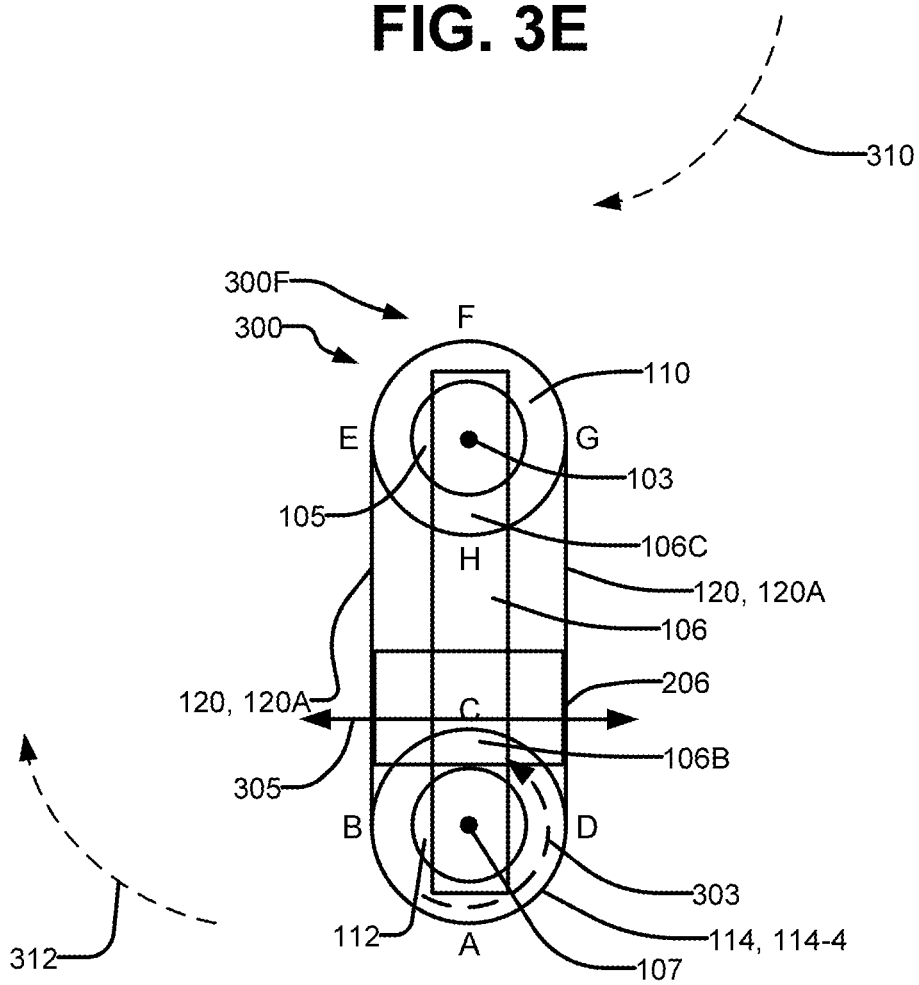

FIGS. 3A and 3B show an example embodiment of a mount 300 in operation. Mount 300 may be similar to mount 100 described herein, except where expressly described as being different or where the context makes it clear that there are differences. Various features and elements of mount 300 that are similar to those of mount 100 are described using similar reference numerals.

Rotational wheel 114 of mount 300 shown in FIGS. 3A and 3B has the same radius and, in some embodiments, the same number of teeth as stationary wheel 110. In FIG. 3A, mount 300 is in a first configuration 300A, where image-capture device 206 is positioned on a first side of gimbal 104 corresponding to a first position 106-1 of support member 106 (about drive shaft axis 103 which is not expressly shown but which is oriented into and out of the page in the illustrated views of FIGS. 3A and 3B). The solid double-headed arrow 301 around gimbal 104 indicates the rotational direction available to support member 106 relative to gimbal 104 about drive shaft axis 103. The dashed arrow 302 indicates the direction of rotation that allows mount 300 to move from first configuration 300A (corresponding to first position 106-1 of support member 106) as shown in FIG. 3A to a second configuration 300B (corresponding to a second position 106-2 of support member 106 about drive shaft axis 103) as shown in FIG. 3B.

From configuration 300A to configuration 300B, motor 104A drives drive shaft 105, and consequently support member 106, to rotate about drive shaft axis 103, the rotational power from motor 104A is transferred from drive shaft 105 to rotational wheel 114 via belt 120 and pulley mechanism 120A, causing rotational wheel 114 to rotate about rotational wheel axis 107 in a rotational direction 303 as support member 106 rotates about drive shaft axis 103 in a rotational direction 302. Processor 125 of controller 124 may be configured to control the rotational speed of drive shaft 105.

FIGS. 3C-3F schematically illustrate the relative movement of rotational wheel 114 and stationary wheel 110 from configuration 300C to configuration 300F. In FIGS. 3C-3F, rotational wheel 114 has the same radius as stationary wheel 110. In FIGS. 3C-3F, points A-D are labelled on the circumference of rotational wheel 114 to indicate the relative orientation of rotational wheel 114 to belt 120. Likewise, points E-H are labelled on the circumference of stationary wheel 110 to indicate the relative orientation of stationary wheel 110 to belt 120. Points A-D are spaced apart by 90 degrees on the circumference of rotational wheel 114. Points E-H are spaced apart by 90 degrees on the circumference of stationary wheel 110.

In FIG. 3C, mount 300 is in configuration 300C. Rotational wheel 114 is on a first side of stationary wheel 110 in a position of 114-1. Image-capture device 206 is positioned parallel to axis 305 with a centre at point C. Axis 305, in the illustrated embodiment, is horizontal, although this is not necessary.

For mount 300 to transition from configuration 300C to configuration 300D (FIG. 3D), motor 104A drives drive shaft 105, and consequently support member 106, to rotate about drive shaft axis 103 (extending in and out of the page in FIGS. 3C-3F) and follows a rotational trajectory 306. Stationary wheel 110 is fixed to gimbal 104 and base 102A (i.e. points E-H remain in the same orientation) as drive shaft 105 rotates in a bore of stationary wheel 110. As described herein, the torque driving the movement of support member 106 generates an additional force (e.g. frictional force) between belt 120 and rotational wheel 114 causing a torque on rotational wheel 114 which rotates rotational wheel 114 and consequently shaft 112 about rotational wheel axis 107 in a rotational direction 303 relative to distal end 106B of support member 106.

As support member 106 rotates about drive shaft axis 103, belt 120 moves relative to the circumferential points E-H on stationary wheel 110. From configuration 300C (FIG. 3C) to configuration 300D (FIG. 3D), belt 120 moves from being in contact with stationary wheel 110 at points F, G, H to being in contact with stationary wheel 110 at points E, G, H. As rotational wheel 114 rotates about rotational wheel axis 107, rotational wheel 114 and the circumferential points A-D move relative to belt 120. From configuration 300C (FIG. 3C) to configuration 300D (FIG. 3D), rotational wheel 114 moves from being in contact with belt 120 at points A, B, C to being in contact with belt 120 at points B, C, D. Rotational wheel 114 moves into a position 114-2 in configuration 300D of mount 300.

Because rotational wheel 114 and stationary wheel 110 have the same radius (and/or the same number of teeth) in the embodiment of FIGS. 3C-3F, rotational wheel 114 rotates exactly 90 degrees about rotational wheel axis 107 in rotational direction 303 as drive shaft 105 (i.e. support member 106) rotates 90 degrees about drive shaft axis 103 in rotational direction 306—between configurations 300C and 300D. The combined effect of rotation of support member 106 and rotational wheel 114 causes image-capture device 206 to remain oriented parallel to axis 305 with its centre at point C in FIGS. 3C-3F throughout the rotation. In embodiments where the radius (and/or the number of teeth) of stationary wheel 110 is different from the radius of rotational wheel 114, rotational wheel 114 rotates about rotational wheel axis 107 at a different angular rate than support member 106 rotates about drive shaft axis 103. Consequently, image-capture device 206 does not remain in the same orientation throughout the rotation. See description of FIGS. 4A-D below.

Mount 300 may transition from configuration 300D into configuration 300E (FIG. 3E) as support member 106 rotates about drive shaft axis 103 following rotational trajectory 308. Rotational wheel 114 moves from position 114-2 into a position 114-3 following rotational trajectory 303 and ends at a second side that is opposed to the first side of stationary wheel 110. From configuration 300D to configuration 300E, belt 120 has moved from being in contact with stationary wheel 110 at points E, G, H to being in contact with stationary wheel 110 at points E, F, H and rotational wheel 114 has moved from being in contact with belt 120 at points B, C, D to being in contact with belt 120 at points A, C, D. Image-capture device 206 remains oriented parallel to axis 305 with its centre at point C.

Mount 300 may further transition from configuration 300E into configuration 300F (FIG. 3F) as support member 106 rotates about drive shaft axis 103 following rotational trajectory 310. Rotational wheel 114 moves from position 114-3 into a position 114-4 following rotational trajectory 303. From configuration 300E to configuration 300F, belt 120 has moved from being in contact with stationary wheel 110 at points E, F, H to being in contact with stationary wheel 110 at points E, F, G and rotational wheel 114 has moved from being in contact with belt 120 at points A, C, D to being in contact with belt 120 at points A, B, D. Image-capture device 206 remains oriented parallel to axis 305 with its centre at point C. Lastly, mount 300 may transition from configuration 300F back to configuration 300C as support member 106 rotates about drive shaft axis 103 following rotational trajectory 312.

Figure 4B:
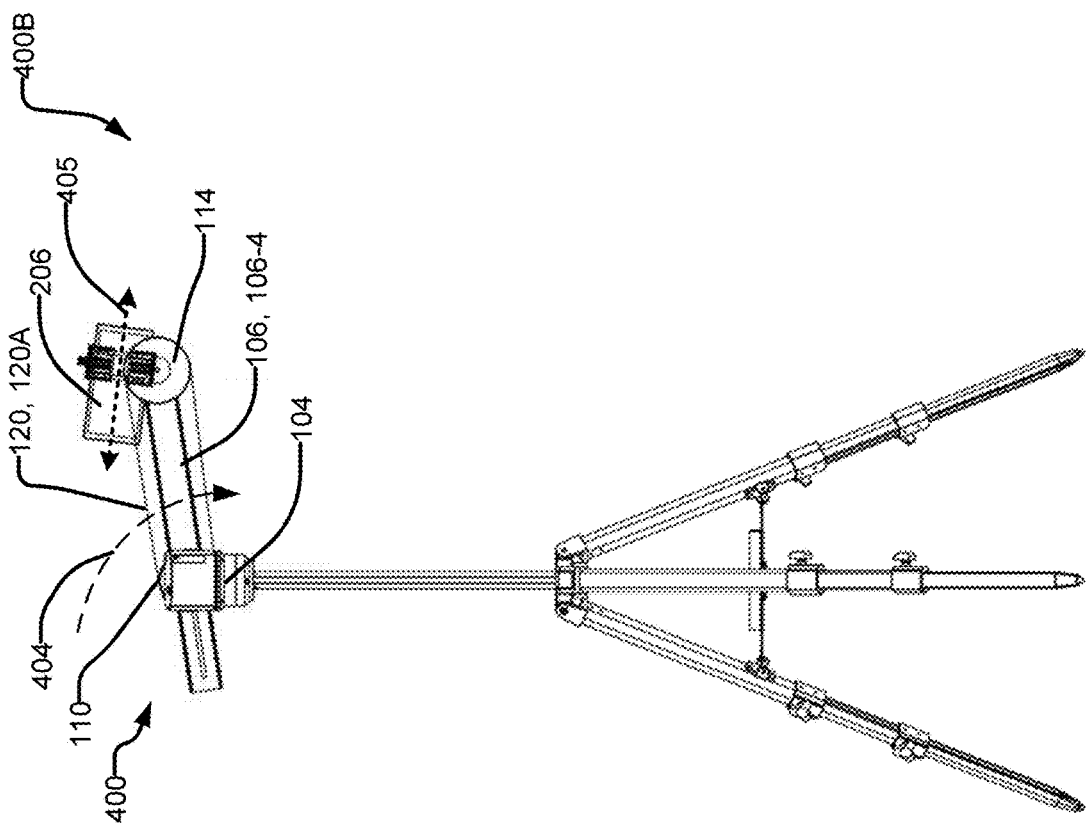
FIG. 4B depicts the example image-capture mount of FIG. 4A in a second orientation and its arm in a corresponding second angular position.
Figure 4A:
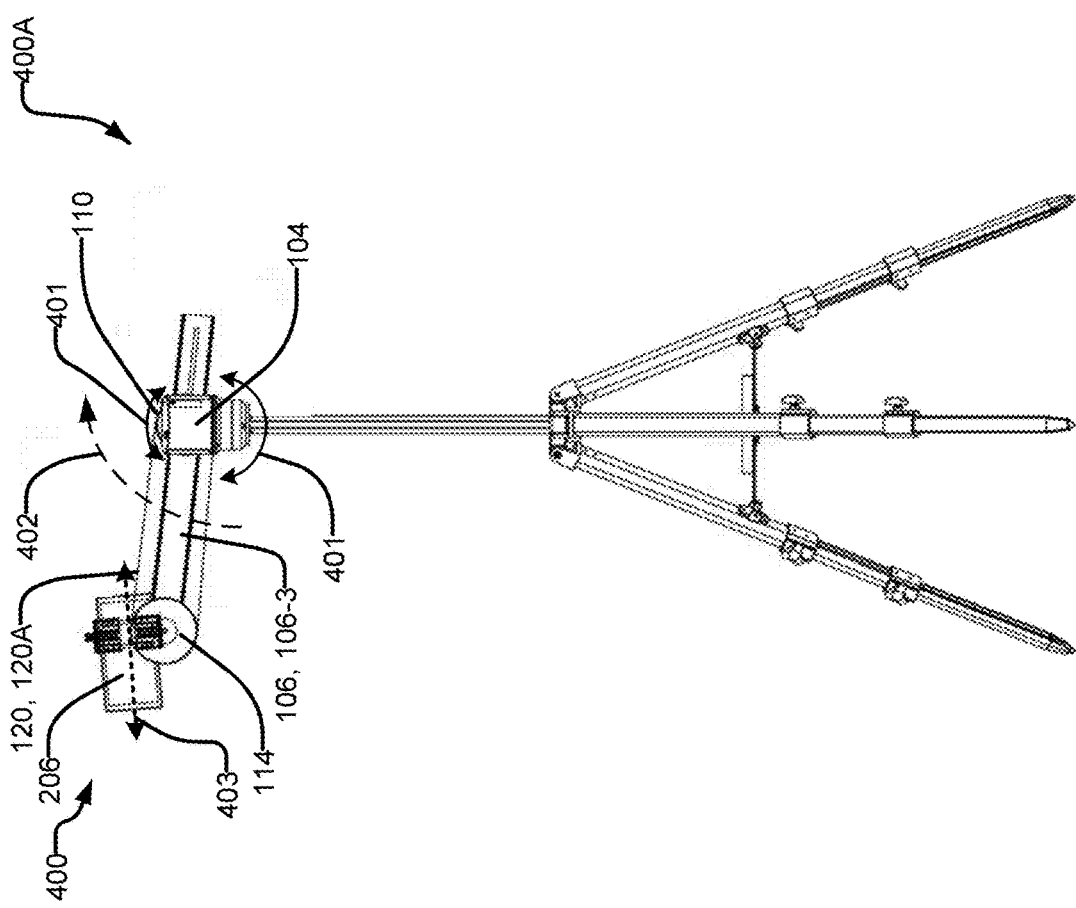
FIG. 4A depicts another example image-capture mount in a first orientation and its arm in a corresponding first angular position.

FIGS. 4A and 4B show another example mount 400 in operation. Mount 400 may be similar to mount 100 and mount 300 described herein, except where expressly described as being different or where the context makes it clear that there are differences. Various features and elements of mount 400 that are similar to those of mount 100 are described using similar reference numerals. Stationary wheel 110 of mount 400 has a different radius from rotational wheel 114 of mount 400. Double-headed arrows 401 indicate the direction of rotation available to support member 106 about shaft axis 103 (not visible in FIGS. 4A and 4B, but oriented into and out of the page in the illustrated view).

In FIG. 4A, mount 400 is in configuration 400A with support member 106 in a corresponding position 106-3. Image-capture device 206 is oriented (about rotational wheel axis 107) in a direction indicated by dashed line 403. For mount 400 to transition from configuration 400A of FIG. 4A to configuration 400B of FIG. 4B, support member 106 rotates about drive shaft axis 103 with the mechanism as described above along rotational trajectories 402 and 404.

In FIG. 4B, mount 400 is in configuration 400B with support member 106 in a corresponding position 106-4. Image-capture device 206 is oriented (about rotational wheel axis 107) in a direction indicated by dashed line 405. The direction of dashed line 405 is different from the direction of dashed line 403—i.e. the orientation of image-capture device 206 about rotational wheel axis 107 is different as between configurations 400A and 400B of mount 400.

The difference in radius (and/or the difference in the number of teeth) of stationary wheel 110 and rotational wheel 114 causes a different amount of rotation for support member 106 (about drive shaft axis 103) and for rotational wheel 114 (about rotational wheel axis 107) and the corresponding change in orientation of image-capture device 206 about rotational wheel axis 107. FIGS. 4C and 4D (not drawn to scale) schematically illustrate the relative movement of rotational wheel 114 and stationary wheel 110 relative to belt 120. In FIGS. 4C and 4D, the radius of rotational wheel 114 is greater than the radius of stationary wheel 110. However, this is not necessary. In other embodiments, the radius of stationary wheel 110 may be greater than the radius of rotational wheel 114.

In FIG. 4C, mount 400 is in configuration 400C with rotational wheel 114 in a first position 414-1. Points A-D are spaced apart on the circumference of rotational wheel 114. Image-capture device 206 is oriented (about rotational wheel axis 107) parallel to axis 408 with its centre located at point C. Following the rotational scheme described above, as mount 400 moves from configuration 400C into configuration 400D of FIG. 4D, support member 106 rotates along rotational trajectory 406 about drive shaft axis 103 while causing rotational wheel 114 to rotate about rotational wheel axis 107 in the opposite rotational direction 303.

Belt 120 moves relative to both stationary wheel 110 and rotational wheel 114. Belt 120 (in the absence of slippage) moves the same distance relative to rotational wheel 114 and stationary wheel 110. Consequently, when rotational wheel 114 has a different circumference from stationary wheel 110, rotational wheel 114 rotates at a different angular rate about rotational wheel axis 107 than support member 106 about drive shaft axis 103. In FIGS. 4C and 4D, as mount 400 moves from configuration 400C to configuration 400D, rotational wheel 114 rotates a smaller angle about rotational wheel axis 107 than support member 106 about drive shaft axis 103 and therefore finishes in position 414-2 (parallel to axis 409) and forming an angle 407 with direction of extension 106A.

Image-capture device 206 has changed its orientation relative to support member 106 during the rotation of support member 106. Image-capture device 206 that alters orientation during rotation of support member 106 could generate image and/or footage that is more unpredictable and dynamic.

FIGS. 5A and 5B depict perspective views of a mount 500 according to another example embodiment. Mount 500 may be similar to mounts 100, 300 and 400 described herein, except where expressly described as being different or where the context makes it clear that there are differences. Various features and elements of mount 500 that are similar to those of mount 100 are described using similar reference numerals.

Mount 500 is set up such that direction of extension 501 of image capture-device 206 is oriented perpendicularly to direction of extension 106A of support member 106 and the image-capture plane (not expressly enumerated) of image-capture device 206 is oriented parallel to rotational wheel axis 107. Therefore, when support member 106 rotates along rotational trajectory 502, causing mount 500 to transition from configuration 500A to configuration 500B, image-capture device 206 moves either closer to or further away from the object and/or scene being captured by image-capture device 206, the effect of which is especially pronounced if the object and/or scene being captured is relatively close to image-capture device 206. Therefore, setup of mount 500 allows yet another different visual effect that could be incorporated into image-capture and/or time-lapse photography.

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The embodiments of the invention described above are intended to be exemplary only. The scope of the invention is therefore intended to be limited solely by the scope of the appended claims.

The invention claimed is:

1. A mount for an image-capture device, the mount comprising:
   a bracket assembly for holding an image-capture device;
   a drive shaft rotatably coupled to a stationary wheel for rotation of the drive shaft relative to the stationary wheel about a drive shaft axis;
   a support member coupled to the drive shaft to rotate about the drive shaft axis therewith, the support member extending radially away from the drive shaft axis; and,
   a rotational wheel rotatably coupled to the support member for rotation of the rotational wheel relative to the support member about a rotational wheel axis, the rotational wheel axis radially spaced apart from, and parallel to, the drive shaft axis; and,
   a motor configured to drive the rotation of the drive shaft about the drive shaft axis wherein a location of the motor is fixed relative to the stationary wheel during rotation of the support member about the drive shaft axis,
   wherein the rotational wheel is coupled to the bracket assembly.

2. A mount according to claim 1 wherein the rotational wheel is fixedly coupled to the bracket assembly such that rotation of the rotational wheel about the rotational wheel axis causes corresponding rotation of the bracket assembly about the rotational wheel axis.

3. A mount according to claim 2 comprising a belt entrained around the stationary wheel and the rotational wheel.

4. A mount according to claim 3 wherein rotation of the drive shaft relative to the stationary wheel about the drive shaft axis causes corresponding rotation of the support member relative to the stationary wheel about the drive shaft axis and wherein rotation of the support member about the drive shaft axis in combination with entrainment of the belt around the stationary wheel and the rotational wheel cause corresponding rotation of the rotational wheel and the bracket assembly relative to the support member about the rotational wheel axis.

5. A mount according to claim 4 comprising a channel-providing member shaped to define a channel, the channel-providing member fixedly coupled to, or integrally formed with, the drive shaft, the channel-providing member comprising a pair of walls elongated in a direction of radial extension of the support member and spaced apart in a direction orthogonal to the radial extension of the support member wherein the pair of walls defines the channel.

6. A mount according to claim 5 comprising a releasable locking mechanism configurable in: an unlocked configuration which permits slidable adjustment of the support member in the direction of radial extension within the channel; and a locked configuration which fixes the support member in the direction of radial extension within the channel.

7. A mount according to claim 4 wherein the stationary wheel is shaped to define a bore that extends through a center of the stationary wheel and where the drive shaft extends through the bore.

8. A mount according to claim 4 wherein the bracket assembly comprises a shaft coupled to the rotational wheel for rotation therewith about the rotational wheel axis.

9. A mount according to claim 8 wherein the support member is shaped to define a bore at a location of the support member spaced in a direction of radial extension away from the drive shaft axis and the shaft extends through the bore.

10. A mount according to claim 9 wherein the shaft bears rotationally against a bore-defining surface of the support member.

11. A mount according to claim 8 wherein the bracket assembly comprises an arm adjustably coupled to the shaft.

12. A mount according to claim 11 wherein the bracket assembly further comprises a U-shaped seat defining a groove at a base of the U-shaped seat and a proximal end of the arm of the bracket assembly comprises a protrusion shaped to be complementary to, and fit into, the groove of the U-shaped seat.

13. A mount according to claim 12 wherein the bracket assembly comprises a lockable pivot joint mechanism which permits pivotal movement of the arm relative to the U-shaped seat about a pivot axis that is orthogonal to the rotational wheel axis.

14. A mount according to claim 3 wherein the belt is a toothed belt that engages with corresponding teeth on outer circumferences of the stationary wheel and the rotational wheel.

15. A mount according to claim 14 wherein a number of teeth on the outer circumference of the stationary wheel is the same as a number of teeth on the outer circumference of the rotational wheel.

16. A mount according to claim 14 wherein a number of teeth on the outer circumference of the stationary wheel is different than a number of teeth on the outer circumference of the rotational wheel.

17. A mount according to claim 1 wherein a radius of stationary wheel is the same as a radius of the rotational wheel.

18. A mount according to claim 1 wherein a radius of stationary wheel is different from a radius of the rotational wheel.

19. A mount according to claim 1 comprising a stand comprising a gimbal and wherein the stationary wheel is rigidly connected to the gimbal.

20. A mount according to claim 19 wherein the stand comprises a pivot joint for facilitating pivotal movement of the gimbal relative to the remainder of the stand about a stand axis.

* * * * *